United States Patent [19]

Williams

[11] 4,167,423

[45] Sep. 11, 1979

[54] SILANE REACTIVE MINERAL FILLERS

[75] Inventor: Thomas C. Williams, Ridgefield, Conn.

[73] Assignee: Union Carbide Corporation, New York, N.Y.

[21] Appl. No.: 817,688

[22] Filed: Jul. 21, 1977

Related U.S. Application Data

[60] Division of Ser. No. 567,817, Apr. 14, 1975, abandoned, which is a continuation-in-part of Ser. No. 476,567, Jun. 5, 1974, abandoned.

[51] Int. Cl.$^2$ ............................................. C09C 1/02
[52] U.S. Cl. ............................... 106/306; 106/308 Q; 106/308 M
[58] Field of Search .............. 106/306, 308 B, 308 Q, 106/308 N, 308 M

[56] References Cited

U.S. PATENT DOCUMENTS

| | | | |
|---|---|---|---|
| 2,296,639 | 9/1942 | Hanahan | 106/295 |
| 2,928,802 | 3/1960 | Rehner et al. | 106/308 Q |
| 3,290,165 | 12/1966 | Iannicelli | 106/308 N |

FOREIGN PATENT DOCUMENTS

| | | |
|---|---|---|
| 523148 | 7/1940 | United Kingdom . |
| 914608 | 1/1963 | United Kingdom . |

*Primary Examiner*—Patrick Garvin
*Assistant Examiner*—J. V. Howard
*Attorney, Agent, or Firm*—Reynold J. Finnegan

[57] ABSTRACT

Metal silicate treated mineral products, said products being silane reactive; a process for producing same; silane modified metal silicate treated mineral compositions; said products and said compositions being useful as fillers or pigments in polymer composite compositions; and the polymer compositions containing said products or said compositions.

7 Claims, No Drawings

SILANE REACTIVE MINERAL FILLERS

This application is a divisional of U.S. application Ser. No. 567,817 filed Apr. 14, 1975, now abandoned which in turn is a continuation-in-part of U.S. application Ser. No. 476,567 filed June 5, 1974, now abandoned.

BACKGROUND OF THE INVENTION

This invention relates to novel metal silicate treated minerals which are receptive toward silane coupling agents. More particularly this invention relates to metal silicate treated inorganic mineral fillers, to a process for producing same, and to polymer composite compositions containing said treated fillers and silane coupling agents, as well as to silane modified metal silicate treated inorganic mineral fillers, and to polymer composite compositions containing said silane modified metal silicate treated inorganic mineral fillers.

The use of finely divided particulate and fibrous mineral materials, commonly referred to as mineral fillers or mineral pigments, for compounding into rubbers, resins, paints, inks, and other substances to form composite compositions is well known in the art. For instance, the use of nonsiliceous mineral fillers, e.g. natural and synthetic calcium carbonates, and partially siliceous synthetically coprecipitated mixed structural pigments, e.g. calcium carbonate-silica and calcium carbonate-metal silicate, as filler components in polymer-filler composites is well known as shown e.g. by British Pat. No. 838,903 and U.S. Pat. Nos. 2,928,802; 3,152,001 and 3,290,165. Moreover, certain wholly siliceous fillers, e.g. natural and synthetic silica fillers and metal silicate fillers, when used as filler components in polymer-filler composites are known to respond to the action of organosilane coupling agents with the production of improved cured composite properties as seen e.g. by U.S. Pat. Nos. 2,665,264; 2,744,879; 2,831,828; 2,831,829; and 2,897,173. However, natural and synthetic calcium carbonates and other non-siliceous mineral fillers do not show any significant or useful response in the presence of organosilane coupling agents by way of improved properties in the finished polymer composites. Since certain non-siliceous mineral fillers, particularly calcium carbonate, are among the most abundant, economical and widely used particulate fillers employed in polymer-filler composites, their lack of response to organosilane coupling agents has constituted a significant area of technological disadvantage in the development of improved polymer-filler composite compositions.

It has now been discovered that metal silicate treated inorganic mineral products can be prepared which can be employed along with organosilane coupling agents in polymer composites to confer improved properties in the finished composites and that said metal silicate treated mineral products can be further modified with organosilane coupling agents to form organosilane modified metal silicate treated mineral products which can also be employed as fillers in polymer composites to confer improved properties in the finished composites.

SUMMARY OF THE INVENTION

Accordingly it is an object of this invention to provide metal silicate treated inorganic mineral products which are responsive to silane coupling agents. It is also an object of this invention to provide a process for the manufacture of said treated mineral products. It is another object of this invention to provide polymer composite compositions containing said treated inorganic mineral products. It is a further object of this invention to provide organosilane modified metal silicate treated inorganic mineral products. Still another object of this invention is to provide polymer composite compositions containing said silane modified metal silicate treated mineral products. Other objects and advantages of this invention will become readily apparent from the following description and appended claims.

More specifically this invention may be described as a metal silicate treated inorganic mineral product, said product having been produced by a process which comprises (a) contacting in the presence of water, the surface of a water-insoluble inorganic mineral selected from the group consisting of metal carbonates, metal sulfates, and mixtures thereof with a precipitated, undried water insoluble silicate salt on said water-insoluble mineral.

DESCRIPTION OF THE PREFERRED EMBODIMENTS

The water-insoluble inorganic minerals employed in the instant invention may be selected from a wide variety of naturally occurring mineral deposits or synthetically produced (e.g. precipitated) inorganic salts of similar mineral composition. Such minerals include water-insoluble metal carbonates and/or metal sulfates wherein the metal is selected from the group consisting of barium, beryllium, calcium, magnesium, strontium, zinc, and mixtures thereof. Such minerals are commonly identified in industrial usage and the art by both their chemical names and mineralogical names and include e.g. barium carbonates (witherites), barium sulfates (barytes, blanc fixe), beryllium carbonates, calcium carbonates (whitings, calcites, marbles, limestones), calcium sulfates (gypsums, anhydrites, alabasters), calcium magnesium carbonates (dolomites), magnesium carbonates (magnesites), strontium carbonates (strontianite), zinc carbonates (smithsonites), as well as the precipitated salts of said carbonates and sulfates, e.g. precipitated calcium carbonates and sulfates, precipitated barium carbonates and sulfates, precipitated zinc carbonates, precipitated magnesium carbonates, and the like. Of course, it is to be understood that in addition to employing only one water-insoluble mineral at a time, mixtures of two or more different water-insoluble minerals can be employed as desired. Moreover, the particular size and shape of the water-insoluble inorganic mineral employed is not critical and is dictated primarily only by the end use of the final treated mineral product desired (e.g. a slab of marble could be treated with the water-insoluble metal silicate salt according to the instant invention if one desired to bond silane coupling agents to the marble). Since the primary end use of the metal silicate treated mineral products of this invention is as fillers or pigments in a polymer-filler composites it is preferred to employ the initial water-insoluble mineral in conventional particulate form. Numerous grades of the different kinds of particulate water-insoluble inorganic minerals mentioned above are listed in "Materials and Compounding Ingredients for Rubber", Bill Publications, New York, New York, 1968. Naturally occurring or synthetically produced water-insoluble inorganic minerals can be employed herein. The preferred minerals are the naturally occurring and synthetic metal carbonates and most preferably the natural calcium carbonates. Of course, it is clear from the above description and it is to be understood that the natural and synthetic water-insoluble inorganic minerals employed in the instant invention are non-siliceous minerals and are not to be confused with partially siliceous synthetically coprecipitated mixed structural pigments or fillers made up of coprecipitated siliceous and non-siliceous components. However, it is also to be understood that said minerals employed in the instant invention may have small amounts of inorganic siliceous substances associated with them as impurities as distinguished from deliberately and intentionally added inorganic siliceous substances.

The water-insoluble metal silicate salts employable in the instant invention include any precipitated, undried, water-insoluble metal silicic acid salt and mixtures thereof, wherein the metal is selected from the group consisting of aluminum, barium, beryllium, cadmium, calcium, cobalt, copper, iron, lead, lithium, magnesium, manganese, mercury, nickel, silver, strontium, tin, zinc, zirconium, and the rare earth metals having atomic numbers from 57 to 71 inclusive.

Said silicic acid salts and methods for their preparation are well known in the art and are conventionally precipitated from an aqueous composition of silicate ions and a water soluble metal salt. The water soluble metal salt used to prepare the silicic acid salts can be any metal salt having a solubility of at least 0.1 weight percent in water at 25° C. wherein the metal is selected from the group consisting of aluminum, barium, beryllium, cadmium, calcium, cobalt, copper, iron, lead, lithium, magnesium, manganese, mercury, nickel, silver, strontium, tin, zinc, zirconium and the rare earth metals having atomic numbers from 57 to 71 inclusive.

Of course, it is to be understood that the water soluble metal salt includes simple salts, double salts, and mixtures of such salts, which salts may contain any anion or combination of anions, which will form a metal salt having the above mentioned solubility, such as chloride, bromide, iodide, nitrate, nitrite, sulfate, sulfite, thiosulfate, thiosulfite, carbonate, bicarbonate, formate, acetate, glycolate, alkylsulfonate, cyanate, cyanide, thiocyanate, chlorate, bromate, iodate, hydroxide and the like. The preferred metals are barium, calcium and zinc while the preferred anions are chloride, nitrate and sulfate. Illustrative of such metal salts include barium chloride, barium nitrate, calcium chloride, calcium nitrate, zinc chloride, zinc nitrate and zinc sulfate.

The water soluble metal salts are normally used in the form of solutions or dispersions in solvents consisting of water or mixtures of water and miscible proportions of organic solvents such as for example, methanol, ethanol, propanol, ethylene glycol, glycerine, 2-methoxyethanol, 2-ethoxyethanol, ethylene glycol dimethylether, diethylene glycol dimethylether, tetrahydrofuran, dimethylsulfoxide, acetone, dimethyl formamide, dimethylacetamide, trimethylamine, hexamethylphosphoramide, and the like. Such metal salts may be employed alone or if desired the form of mixtures of two or more different salts. In additiion such water soluble solutions or dispersions if desired may contain acids such as hydrochloric, sulfuric and nitric acids, and the like, in amounts necessary to satisfy a desired stoichiometry in forming the water-insoluble metal silicate salt desired to be employed in the instant invention.

The silicate ions in the above mentioned aqueous compositions used in the preparation of said water-insoluble metal silicate salts can include monosilicate as well as polysilicate ions and mixtures thereof which ions can be derived from any silicate solution, i.e. a liquid mixture of a solvent and one or more compounds of silicon capable of supplying monosilicate or polysilicate anions such as for example monomeric and polymeric silicic acids; alkali metal salts of monomeric and polymeric silicic acids, except lithium; organosubstituted ammonium, guanidinium, and hydrazinium salts of monomeric and polymeric silicic acids; lower alkyl, alkoxyalkyl, alkylaminoalkyl and dialkylaminoxy esters of monomeric and polymeric silicic acids; acylates of lower alkyl and alkoxyalkyl carboxylic acids and monomeric and polymeric silicic acids; tetrakis (dialkylamino) silanes and partially hydrolyzed and condensed derivatives thereof; and the like. The solvent component of such silicate solutions consists of water or water-miscible organic solvents such as mentioned above, or mixtures thereof. While a single source of silicate ions may be employed if desired mixtures of two or more different sources of silicate ions may be used. In addition, such sources of silicate ions if desired may contain bases such as sodium, potassium, ammonium, and substituted ammonium hydroxides in amounts necessary to satisfy a desired stoichiometry in forming the water-insoluble metal silicate salt desired to be employed in the instant invention.

As pointed out above, said water-insoluble metal silicate salts are employed in the instant invention in the form of precipitated, undried salts, that is to say said salts have not been completely dried after their initial formation and are used while still at least in their precipitation-moist state. Preferably it is desired to employ the water-insoluble metal silicate salts in their freshly precipitated, highly hydrated and incompletely condensed form, since the time interval between formation of the water-insoluble metal silicate salt and its contact with the water-insoluble mineral has a bearing on achieving the most optimum results desired. For example, it has been found that when precipitated metal silicate, which had been kept in dilute aqueous suspension for various time intervals, is slurried with a water-insoluble mineral, the silicate treated mineral product after work up is found to be responsive to silane coupling agents. However, as the time interval between formation of the water-insoluble metal silicate and its contact with the water-insoluble mineral was increased, the response displayed by the silicate treated mineral to silane coupling agents lessened. In an extreme case where a previously completely dried and condensed water-insoluble metal silicate was redispersed in water and slurried with a water-insoluble mineral, the recovered treated mineral product failed to show any response to the silane coupling agent. Thus, in order to insure the most optimum results, it is most preferred to prepare the silicate-treated mineral products of this invention by precipitation of the water-insoluble metal silicate salt while in the presence of the water-insoluble mineral to be treated. Less preferably but still within the scope of the invention is to contact the water-insoluble mineral with the water-insoluble undried metal silicate within a short time, the shorter the better, after precipitation of said silicate.

The metal silicate treated inorganic mineral products of the instant invention which are responsive to silane coupling agents can be prepared in any manner involving contact of the surface of the water insoluble mineral in the presence of water with a precipitated, undried water-insoluble metal silicate salt and thereafter drying the silicate treated mineral product.

Illustrative of such methods are as follows:

(A) Adding the water-soluble metal salt solution and the water-soluble silicate solution either concurrently or consecutively to a stirred aqueous slurry of the water-insoluble inorganic mineral to be treated to form the water-insoluble metal silicate salt in the presence of the mineral. The silicate treated mineral product can then be dried and recovered by any conventional method desired.

(B) First forming a dilute aqueous slurry of the water-insoluble metal silicate salt by mixing together a water-soluble silicate solution and a water soluble metal salt and then subsequently and within a short time and without drying the so formed insoluble metal silicate salt, bringing the water-insoluble metal silicate slurry into contact with the surface of the water-insoluble inorganic mineral to be treated. The silicate treated mineral product can then be dried and recovered by any conventional method desired.

(C) The silicate treated mineral product can also be prepared by continuously pumping streams of an aqueous slurry of the water-insoluble inorganic mineral to be treated, a water-soluble metal salt solution, and a water-soluble silicate solution into a zone of high turbulence as in a mixing tee, and removing a slurry of the silicate treated mineral product which can then be dried and recovered by any conventional method desired.

(D) Aqueous solutions of the water-soluble metal salt and water-soluble silicate can be sprayed in an atomized form either concurrently or consecutively onto an agitated mass of the water-insoluble inorganic mineral to be treated. The silicate treated mineral product can then be dried and recovered by any conventional manner desired.

Preferably it is desired to precipitate the water-insoluble metal silicate salt while in contact with the surface of the water-insoluble inorganic mineral to be treated, especially by method (A) outlined above. For example, to a stirred slurry of particulate calcium carbonate in water are added water solutions of sodium silicate and calcium chloride in proportions such as to precipitate a small amount of water-insoluble calcium silicate. The calcium silicate treated calcium carbonate mineral product is then washed, filtered, dried and recovered as desired and can be employed as explained more fully below.

In forming the metal silicate treated inorganic mineral products of this invention by any of the above described methods the process factors of initial mineral concentration, temperature, reactant solution concentrations and addition rates are not critical although certain practical choices may be made as described below.

Initial mineral concentrations are not critical and at the start of a preparation may range from 100 percent by weight, that is undiluted dry inorganic mineral as is spray coating methods, downward to any desirable level as in slurry methods. In slurry preparations the inorganic mineral concentrations are usually started at the highest levels which permit adequate agitation by the equipment used.

The temperature employed during formation of the metal silicate treated mineral products is not known to be critical and may be held at any point between the freezing and boiling point temperatures of the aqueous solvent. For convenience and economy, the treating procedure is usually carried out under normal ambient room conditions, i.e. from about 18° C. to 30° C. While normal atmospheric pressure is also normally used, higher or lower pressures can be employed if desired.

The concentrations of the water-soluble metal salt and water-soluble silicate reactants in their solutions are not critical and are merely selected to form stable solutions or dispersions at levels convenient for the particular preparation method employed. For example, in most slurry preparations, concentrations of about 10 weight percent are convenient although higher or lower levels could be used. On the other hand, in spray treatment of the mineral, higher reactant concentrations are useful to avoid clotting of the agitated powder.

The rates of reactant solution addition are also not critical but localized overconcentrations in the reaction mass should be avoided. Thus in batch slurry methods it is convenient to add one reagent solution quite rapidly to the slurry (usually, but not necessarily the silicate solution) and to control the rate of water-insoluble metal silicate formation by adding the other reactant solution over a period ranging from a few minutes to several hours or longer. In contrast, where very high agitation rates are used, as in continuous mixing tees, the entire amounts of reagents required per unit of mineral may be concurrently added in a fraction of a second.

As pointed out above, it is preferred that the process factor described as contact time, i.e. that time interval between the formation of the water-insoluble metal silicate and its contact with the water-insoluble inorganic mineral be as short as possible to achieve the optimum results desired.

The procedures used for drying and recovery of the metal silicate treated water-insoluble inorganic mineral are not critical and any conventional method can be used as desired such as spray drying, leaving it to dry at room temperature, oven drying and the like. Normally the metal silicate treated mineral is washed with water and separated from the reaction solution by filtration, e.g. and then oven dried. Of course it is to be understood that the metal silicate treated mineral product may still contain some moisture even after drying but it is generally preferred to dry the metal silicate treated mineral to an essentially constant weight at temperatures above about 100° C. or at least to a moisture content at which the metal silicate treated mineral is no longer damp to the touch. It should also be understood that if the mineral to be treated is employed in its particulate filler or pigment form, the metal silicate treated mineral product can easily be returned to its particulate form by any suitable comminution method if said product is obtained in cake form.

The chemical compositions of the water-insoluble metal silicate salts employed herein can also be conveniently expressed in terms of metal oxide ratios for example, $M_xO_y/SiO_2$ wherein M is the metal and x and y are the normal combining valences of the oxide and metal ions respectively as explained for instance in "Dana's Mineralogy", by Dana, 18th Edition, John Wiley, New York, New York, 1971, pg. 202. Thus, the metal oxide ratio of the water-insoluble metal silicate salts equals the number of moles of $M_xO_y$ divided by the number of moles of $SiO_2$ in the salt. The metal oxide ratio of the water-insoluble metal silicate salts employed in the instant invention may range from about 0.1 to 4.0 or higher if desired, while a metal oxide ratio of less than about 3.1 is preferred.

The amount of water-insoluble metal silicate employed in the instant invention obviously need only be that amount sufficient to render the untreated water-insoluble inorganic mineral starting material responsive or reactive to silane coupling agents which will of course be largely dependent upon the desired end use of the silicate treated mineral product. Since it is preferred to employ the water-insoluble metal silicate treated inorganic mineral product in particulate form, the water-insoluble metal silicate salt can generally be precipitated and used in amounts ranging from about 0.1 to about 20.0 parts by weight per 100 parts by weight of the inorganic mineral starting material. Of course, lower or higher amounts may be employed if desired. Preferably the amount of water insoluble metal silicate salt used ranges from about 0.3 to about 10.0 parts by weight per 100 parts by weight of the inorganic mineral starting material.

The amount of water present need only be sufficient to dissolve the water soluble metal salt and silicate ion reactants as for example when solutions of water soluble metal salt and solutions of silicate ion are sprayed onto the surface of the water insoluble inorganic mineral being treated. However, larger amounts of water may be employed for convenience and ease of treatment when it is desired that the water insoluble inorganic mineral be handled in the form of a paste or fluid slurry.

Thus, the instant invention involves the surprising discovery that water-insoluble inorganic minerals which are unresponsive to silane coupling agents can be made reactive toward silane coupling agents by contact with small amounts of a precipitated, undried water-insoluble metal silicate salt. This discovery is demonstrated by the fact that when employed as fillers or pigments in polymer composites along with a silane coupling agent the untreated water-insoluble inorganic minerals produce no significant changes in finished composite product properties from those conferred by use of the untreated mineral alone. However, the metal silicate treated water-insoluble inorganic mineral products of the instant invention clearly demonstrate their responsiveness and activity toward the silane coupling agents in such polymer composites by imparting improved physical properties to the finished composite product. Yet even the metal silicate treated mineral products of the instant invention by themselves, without silane coupling agents, produce no significant changes in finished composite properties from those conferred by the untreated mineral. Thus, the significant improvements in finished composite properties can only be demonstrated by the use of a combination of both the metal silicate treated mineral products of the instant invention and silane coupling agents. Although not intending to be bound by any theory or mechanism, this phenomenon leads one to express the belief that the metal silicate treated water-insoluble inorganic mineral products of the instant invention consist essentially of said mineral having a coating of the water-insoluble metal silicate salt associated with its surface. Thus, unlike any sort of mixed crystal form of coprecipitated mineral fillers or pigments, the metal silicate treated mineral products of the instant invention which are prepared from already formed minerals that have been subsequently contacted with a water-insoluble metal silicate salt as described herein are believed to be of a layered form.

While the metal silicate "layer or coating" per se on the metal silicate mineral products of the instant invention is not measurable, its presence is surely confirmed by the display of large easily measurable responses of said silicate treated mineral products to silane coupling agents in terms of finished polymer composite properties as explained above.

Accordingly the metal silicate "coatings" associated with the metal silicate treated water-insoluble inorganic mineral products of this invention may completely encapsulate the mineral employed or may only represent a partial coating of some portion of the surface of the treated mineral or may consist of an association of discrete metal silicate moieties at non-contiguous sites of the mineral particles. Moreover, said metal silicate "coatings" may consist of a single silicate compound or of two or more different metal silicate compounds associated with the treated mineral. When two or more metal silicate compounds are employed or desired they may be applied in any selected sequence. For example, for a "coating" consisting of water-insoluble metal silicates A and B, "A" may be applied first and "B" second or the reverse order may be used. In addition, it is evident that the chemical compositions of the water-insoluble metal silicate salts used to form the "coatings" on the silicate treated water-insoluble inorganic mineral can be varied independently of each other if desired. For example, the water-insoluble metal silicate salt within a given "coating" may contain one or more metal ions and with each metal ion a metal oxide ratio $M_xO_y/SiO_2$ as explained above can be associated as an independent compositional parameter and these may be kept constant or varied according to some predetermined desire by controlling starting ratios, order of addition, and feed rate ratios of the water-soluble metal salt and silicate solutions. In the simplest case involving two metal ions in the silicate "coating" of the treated mineral, the average metal oxide ratio is used and a mixed structure water-insoluble metal silicate coating is provided. Of course, it is also evident that much more complex "coatings" could be prepared within the scope of this invention by varying both the "coating" structure and composition if desired as outlined above.

As pointed out above, a further aspect of the instant invention is directed to an organosilane modified metal silicate treated inorganic mineral composition, said composition having been produced by a process which comprises contacting a water-insoluble metal silicate inorganic mineral product of this invention as hereinabove described with an organosilane coupling agents selected from the group consisting of organo-functional silanes having the formula

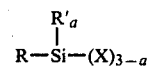

wherein R which contains a carbon atom directly bonded to the Si atom of the above formula represents a functionally substituted organic radical, R' represents a radical selected from the group consisting of R and monovalent hydrocarbon radicals, a has a value of 0 or 1 and X represents a hydrolyzable group, the hydrolyzates of said silanes, the condensates of said silanes, and mixtures thereof.

Said organosilane modified mineral compositions can be prepared by any method involving intimate contacting one or more of the water-insoluble metal silicate treated inorganic mineral products of this invention with one or more said organosilane coupling agents, singly or in admixture, consecutively or concurrently as desired. For example, by way of illustration, said organosilane coupling agents in neat form or optionally liquid solutions or dispersions of said organosilane coupling agents in water or inert diluent carriers can be sprayed in a atomized form onto an agitated mass of the finely divided water-insoluble metal silicate treated inorganic mineral products to be modified. Alternatively liquid suspensions of the finely divided water-insoluble metal silicate treated inorganic mineral products to be modified along with said organosilane coupling agents in neat form or liquid solutions or dispersions of said coupling agents in water or diluent carriers can be introduced into a zone of high turbulence, as in a mixing tee or as in the vicinity of a rapidly moving rotary stirrer. The desired organosilane modified mineral compositions can be recovered by any conventional method desired, and can be used as is or they can be dried at ambient or elevated temperatures, e.g. about 100° C., by any conventional method as desired.

The amount of said organosilane coupling agent that can be employed in forming the silane modified silicate treated mineral compositions of this invention is not narrowly critical and can range from about 0.01 to 50 parts by weight and preferably from about 0.10 to 10.0 parts by weight per 100 parts by weight of the water-insoluble metal silicate treated inorganic mineral product to be modified, although higher or lower amounts may be employed if desired. Likewise said silane coupling agents and said minerals to be modified can be contacted at any suitable temperature, ambient temperatures generally being preferred, e.g. about room temperature. The time period of contact between the silane coupling agent and the mineral to be modified is also not critical and need only be sufficient to provide intimate contact between the ingredients involved.

Moreover, while the organosilane modified water-insoluble metal silicate treated inorganic mineral compositions of this invention can be prepared merely by contacting a organosilane in neat form with the dried metal silicate treated mineral product to be modified, if desired, as pointed out above, an inert diluent and/or water can be added to facilitate handling of the materials involved. Any conventional inert diluent which will not adversely effect the organosilane coupling agent and water-insoluble metal silicate treated mineral filler, and the desired resultant silane modified silicate treated mineral composition can be employed. Examples of such inert diluents include hydroxy-containing compounds e.g. alcohols such as methanol, ethanol, propanol, butanol, and the like; hydrocarbons such as hexane, heptane, benzene, toluene, and the like, ethers such as diethylether, dipropylether and the like; esters and ketones, such as ethyl acetate, acetone, methylethylketone, diethylketone and the like. Of course, the amount of added water and/or inert diluent employed is not critical since either solutions or dispersions of said silanes and/or mineral products are employable herein. Indeed the production of the organosilane modified metal silicate treated inorganic mineral compositions can be carried out in the absence of any added water and/or added inert diluent.

Of course, it is to be understood that the organosilane coupling agents employed in the production of the organosilane modified water-insoluble metal silicate treated inorganic mineral compositions of this invention include and encompass in addition to the silane compounds per se, the hydrolyzates of said silanes, the condensates of said silanes, and mixtures thereof. Such is completely obvious to one skilled in the art, e.g. the employment of water as a diluent can cause hydrolysis and/or condensation of the silane compound employed in view of the hydrolyzable groups on the silane. Indeed if desired the silane compound can be hydrolyzed and/or condensed prior to its contact with the silicate treated mineral filler to be modified. Such hydrolysis and/or condensation may also be caused by atmospheric moisture conditions and/or water molecules normally found on the surface of the silicate treated mineral filler employed. Of course, the terms "hydrolyzate" and "condensate" used herein are meant to include cohydrolyzates and cocondensates of more than one of such organofunctional silanes hereinabove described. Thus, while the precise structural configuration of the organosilane modified water-insoluble metal silicate treated inorganic mineral composition products of this invention is not determinable, it is to be understood that said composition products also include and encompass the hydrolyzates, condensates, and mixtures thereof. It is to be further understood that the instant invention also includes the organosilane modified water-insoluble metal silicate treated inorganic mineral composition products obtain upon removal of the inert diluent carrier if such is employed in the production process.

The organosilane coupling agents and/or methods for their preparation are well known in the art and include e.g. organofunctional silanes having the formula

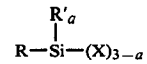

wherein R which contains a carbon atom directly bonded to the Si atom of the above formula represents a functionally substituted organic radical, R' represents a radical selected from the group consisting of R and monovalent hydrocarbon radicals containing from 1 to 6 carbon atoms, e.g. phenyl and alkyl radicals, especially methyl, a has a value of 0 or 1, preferably 0, and X represents a hydrolyzable group the hydrolyzates of said silanes, the condensates of said silanes, and mixtures thereof. Illustrative of the more preferred functionally substituted organic radicals are unsaturated organic radicals such as olefinic radicals, e.g. vinyl, allyl, gamma-methacryloxypropyl, and the like; aminosubstituted radicals such as aminoalkyl radicals e.g. beta-aminoethyl, gamma-aminopropyl N-beta(aminoethyl) gamma-aminopropyl, and the like; epoxy substituted radicals such as beta-(3,4-epoxycyclohexyl)-ethyl, gamma-glycidoxypropyl, and the like; and mercapto substituted radicals, such as beta-mercaptoethyl, gamma-mercaptopropyl, and the like. Among the more preferred silane coupling agents that may be mentioned are vinyltrichlorosilane, vinyltriethoxysilane, vinyltrimethoxysilane, vinyltris(2-methoxyethoxy) silane, gamma-methacryloxypropyltrimethoxysilane, beta-(3,4-epoxycyclohexyl)-ethyltrimethoxysilane, gamma-glycidoxypropyltrimethoxysilane, vinyltriacetoxysilane, beta-mercaptoethyltriethoxysilane, gamma-mercaptopropyltrimethoxysilane, beta-aminoethyltriethoxysilane, gamma-aminopropyltriethoxysilane, N-beta-(aminoethyl)-gamma-aminopropyltrimethoxysilane and the like.

Additional silanes which may be used in the practice of this invention include the following:

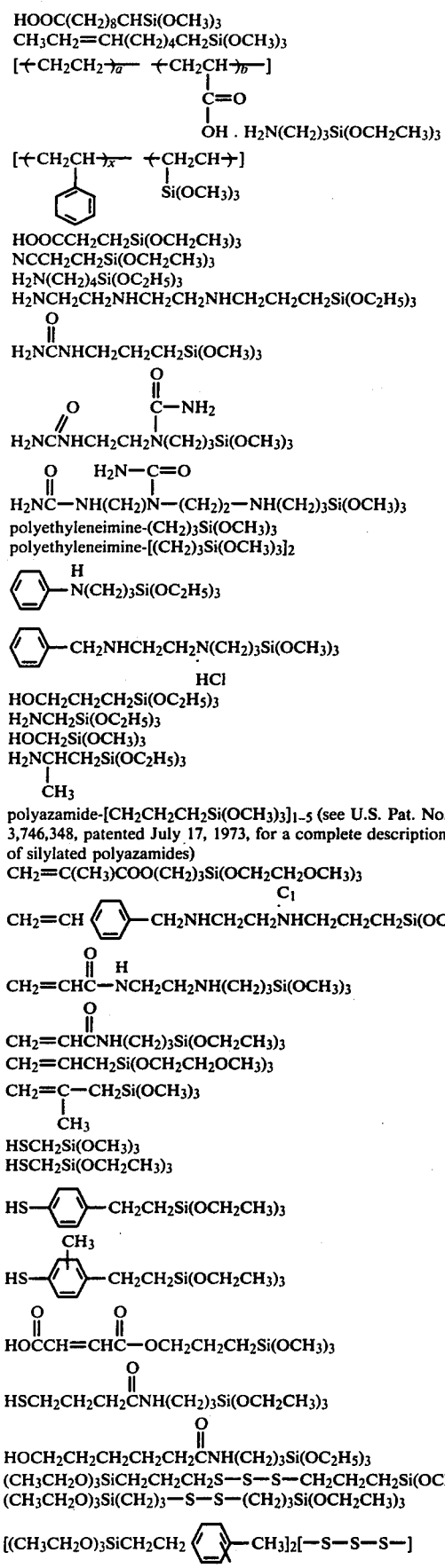
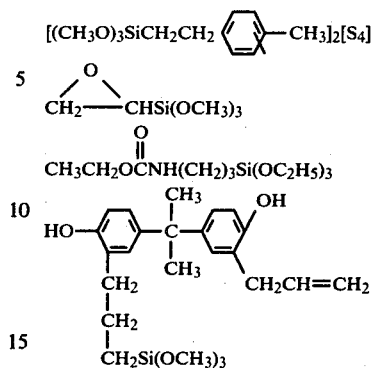

and the like.

Thus, the instant invention involves the further discovery that performed organosilane modified water-insoluble metal silicate treated inorganic mineral compositions can be prepared and used as fillers in polymer/filler composites to impart improved physical properties (e.g. tensile modulus) to the finished composite product even in the absence of any further additional amount of organosilane coupling agent ingredients in the formulation of the polymer/filler composite. The measurable improvement of the finished polymer composite properties attributable to the use of the organosilane modified water-insoluble metal silicate treated inorganic mineral composition fillers of this invention clearly demonstrates that a definite interaction (i.e. response or reaction) between the silane coupling agent and the silicate treated mineral filler employed) takes place in the production of said composition fillers.

The metal silicate treated inorganic mineral products and the organosilane modified metal silicate treated mineral compositions of the instant invention have a wide range of utility and may be employed as reinforcing filler or pigment agents in any conventionally known polymer composite formulations that generally require a filler or pigment such as rubbers, thermoplastic and thermosetting resins, paints, varnishes, inks, and the like, in the same manner that conventional mineral fillers and pigments have been employed heretofore. Moreover, improved physical properties are imparted to the finished polymer composite when the organosilane modified metal silicate treated mineral compositions of the instant invention are employed even in the absence of additional organosilane coupling agents, or when the metal silicate treated mineral products of the instant invention are employed as fillers along with silane coupling agents in conventional polymer composites, e.g. rubbers, resins, etc. Such improved properties may be many and varied depending upon the particular materials employed. However, such effects are usually easily determinable and manifested through changes in the values of the finished composite properties away from the values of the same properties displayed at the absence of any silane coupling agent. For example, in elastomeric and resinous composites the improved effects attributable to the instant invention are often seen in the finished composite product in terms of their resistance to deforming forces such as commonly expressed by tensile, compression and shear moduli, in increased abrasion resistance and in decreased hysteresis losses in flexure, and other such physical properties.

Still another aspect of the instant invention is polymer composite compositions comprising as the essential ingredients (a) a polymer component, (b) an organosilane coupling agent and (c) as the filler component, a metal silicate treated inorganic mineral product of the present invention, or alternatively (a') a polymer component, and (b') as the filler component, an organosilane modified metal silicate treated inorganic mineral composition of the instant invention, and optionally (c') an organosilane coupling agent.

It is to be understood that while polymer composite compositions comprising as the essential ingredients either the above defined components (a), (b) and (c), or alternatively (a') and (b') and optionally (c') can be regarded as practically equivalent with respect to the development of improved properties in the finished composite state, preference for assembling specific polymer composites from the above defined components (a), (b) and (c) rather than from the above defined components (a') and (b') and optionally (c') and vice versa may arise depending on the particular finished polymer composite composition desired, the particular facilities and equipment available for assembly of the composite, and requirements of the end use in which the composite is to be employed. By way of illustration, where a specific combination of metal silicate treated mineral product (c) and organosilane coupling agent (b) are to be used in large total amounts among several polymer composite assembly sites, it may be most efficient and economical to provide and equivalent organosilane modified metal silicate treated mineral composition to the several sites. Thus, preference may be developed on the basis of efficiency and economy factors. Furthermore, preference may arise from technological factors as for example, when a by-product from interaction of an organosilane coupling agent (b) and a metal silicate treated mineral filler (c) is in some way detrimental or undesirable, then a technologically based preference may be developed for the alternative component (b') i.e. an equivalent organosilane modified metal silicate treated mineral composition filler. Other examples will be readily envisioned by those skilled in the art.

The polymer components of the novel composites of this invention as well as methods for their preparation are well known in the art and may include e.g. either singly or in adjuncture any of the synthetic homopolymers and copolymers of olefinic and diolefinic monomers such as ethylene, propylene, butylenes, methylpentenes, styrenes, alpha-methyl styrene, vinyl chloride, vinyl fluoride, vinylidene chloride, acrylonitrile, methacrylonitrile, vinyl alcohol esters, acrylic acid and its esters and amides, methacrylic acid and its esters and amides, allyl phthalate esters, butadiene, isoprene, chloroprene, ethylidene norbornene, 1,5-hexadiene, divinyl benzenes and the like, as well as synthetic condensation polymers commonly classed as alkyd resins, polyesters, nylons, phenolics, epoxides, polyslufones, polysulfides, polysulfonates, polysulfonamides, polyurethanes, polyureas, and the like, as well as oligomers and polymers derived from plant and animal sources such as cellulose esters and ethers, carbon-carbon unsaturated fatty acid triglycerides, and natural hevea and ficus rubbers, and the like. The preferred polymers are rubber polymers and thermoplastic and thermosetting resins that lead to the conventional crosslinked product articles of same.

The organosilane coupling agent components of the novel composites of this invention as well as methods for their preparation are well known in the art and include the hereinabove defined organofunctional silanes as well as the hydrolyzates and condensates of said silanes, and mixtures thereof. The function of a silane coupling agent to provide a strong chemical bridge between a silane reactive filler and polymer employed is well known in the art. However, it is indeed surprising that such is accomplished in polymer/filler composites comprising the above defined components (a) (b) and (c) when there is so little silicate employed in the entire polymer composite formulation. It is further surprising that such may be accomplished in polymer/filler composites comprising the above-defined components (a') and (b') which do not require the presence in the composite formulation of any further additional amount of organosilane coupling agent component (c') although such an optional ingredient (c') may be of course employed if desired. It is of course understood that for effective coupling action in a particular polymer-filler composite, it is necessary to select the appropriate organosilane coupling agent, i.e. one which is suitably reactive towards both the polymer component and the filler component for each particular polymer-filler composite considered. Thus while there may be more than one appropriate silane coupling agent for a particular polymer composite, a given silane coupling agent may not be appropriate for all polymer composites. The selection of the most preferred silane coupling agent for any particular polymer composite is well within routine experimentation.

Of course, the filler component of the novel polymer composite compositions of this invention comprise the metal silicate treated inorganic mineral products (above-defined component (c)) of the instant invention as defined herein above, and the organosilane modified metal silicate treated inorganic mineral compositions (above-defined component (b')) of the instant invention as defined herein above.

The particular manner of compounding and finishing the polymer composite compositions of this invention as well as the various amounts of ingredients employed is not critical for such is conventionally known and merely depends on the particular finished polymer composite desired along with the ultimate end use for which it is to be employed, and such conventional steps as compounding, crosslinking, drying, and the like may be conducted in the same known manner as heretofore employed for conventional polymer composites containing siliceous fillers. In general the amount of organosilane coupling agent component (b) employed with a metal silicate treated mineral filler component (c) will normally range from about 0.1 to 10 parts by weight per 100 parts by weight of metal silicate treated mineral filler employed although higher or lower amounts may be employed although higher or lower amounts may be employed if desirable. Of course the amount of metal silicate treated mineral filler component (c) or the amount of organosilane modified metal silicate treated mineral composition filler component (b') employed in a given composite may range from as little as 0.1 parts by weight up to as high as 300 parts by weight or higher per 100 parts by weight of polymer employed for such merely depends on the desired end product and use. Of course the amount of the optional organosilane coupling agent component (c') employed may range from nothing up to 10 parts by weight or higher per 100 parts by weight of polymer employed.

It is to be understood that in addition to the essential components described above, the novel polymer-filler composite compositions of this invention can also contain as desired, various other conventional ancillary ingredients such as softening, plasticizing and peptizing agents, lubricating agents, conventional particulate and fibrous fillers, coloring dyes and pigments, antioxidant and antiozonant agents, ultra-violet protective agents, odorizing agents, thermal decomposition protective agents, crosslinking agents, cure rate accelerating and activating agents and the like. Of course, the multitude of various conventional utility applications of the finished composite articles are well known to anyone skilled in the art.

The following examples are illustrative of the instant invention and are not to be regarded as limitative. It is to be understood that all parts, percentages and proportions referred to herein and in the claims are by weight unless otherwise indicated. Tensile modulus is defined as the tensile stress in pounds per square inch or original cross-sectional area necessary to produce a given extension in a composite specimen, usually 300% of the unstressed length. desirable. Of course the amount of metal silicate treated mineral filler employed may range up to as high as 300 parts by weight or higher per 100 parts by weight of polymer employed for such merely depends on the desired end product and use.

The following examples are illustrative of the instant invention and are not to be regarded as limitative. It is to be understood that all parts, percentages and proportions referred to herein and in the claims are by weight unless otherwise indicated. Tensile modulus is defined as the tensile stress in pounds per square inch of original cross-sectional area necessary to produce a given extension in a composite specimen, usually 300% of the unstressed length.

EXAMPLE 1

500 parts of wet ground calcium carbonate (calcite mineral, Atomite, 2.5 micron, Thomson-Weinman Co.) were added to 2000 parts of rapidly stirred water at ambient room temperature (23° C.) to form a fluid slurry. 200 parts of a 10 wt.% aqueous solution of sodium metasilicate nonahydrate ($Na_2SiO_3.9H_2O$) were then added to the stirred slurry followed by dropwise addition over a period of 20 minutes of 78.1 parts of a 10 wt. % aqueous solution of anhydrous calcium chloride ($CaCl_2$) to provide 1.64 parts of calcium silicate per 100 parts of the calcium carbonate mineral as charged. The mixture was then rested until the solids had settled out and the upper water layer was siphoned off. The solids were washed twice, each time by adding 1000 parts of water, stirring, settling and siphoning off the upper layer. To assist drying, the solids were then washed by adding 1000 parts of acetone, stirring, settling and siphoning off the upper layer. The solids were then filtered out and oven dried at 150° C., 2 mm. Hg. pressure for 4 hours. The dried solids were then pulverized to produce 492 parts of the desired water-insoluble calcium silicate treated calcium carbonate mineral which was identified and found to contain by analysis, 1.27 parts of calcium silicate (as $CaSiO_3$) per 100 parts of product.

EXAMPLE 2

This example illustrates the preparation of a calcium silicate treated carbonate filler wherein a base (NaOH) is used to provide a calcium silicate having a $CaO/SiO_2$ ratio of 3/1 as charged.

750 parts of wet ground calcium carbonate (calcite mineral, Atomite, 2.5 micron, Thomson-Weinman Co.) were added to 3000 parts of water to form a fluid slurry. 152.2 parts of a 10 wt.% aqueous solution of sodium metasilicate nonahydrate and 85.8 parts of a 10 wt.% aqueous solution of sodium hydroxide were added to the stirred slurry followed by dropwise addition over 20 minutes of 178.5 parts of a 10 wt. % aqueous solution of anhydrous calcium chloride to provide 1.63 parts of calcium silicate having a $CaO/SiO_2$ ratio of 3/1 as charged per 100 parts of the calcium carbonate mineral. The mixture was then rested until the solids had settled and the upper water layer was siphoned off. The solids were filtered off and washed with water on the filter. The washed solids were dried at ambient room temperature for 16 hours then oven dried at 110° C. for 24 hours.

EXAMPLE 3

This example illustrates the preparation of a calcium silicate treated carbonate filler wherein an acid (HCl) is used to provide a calcium silicate having a $CaO/SiO_2$ ratio of 1/3 as charged.

750 parts of wet ground calcium carbonate (calcite mineral, Atomite, 2.5 micron, Thomson-Weinman Co.) were added to 3000 parts of water to form a fluid slurry. 441.3 parts of a 10 wt. % aqueous solution of sodium metasilicate nonahydrate were added to the stirred slurry followed by dropwise addition over 20 minutes of a mixture of 57.5 parts of a 10 wt. % aqueous solution of anhydrous calcium chloride with 75.6 parts of a 10 wt.% aqueous solution of hydrochloric acid to provide 1.63 parts of calcium silicate having a $CaO/SiO_2$ ratio of 1/3 as charged per 100 parts of calcium carbonate mineral. The mixture was then worked up, washed and dried according to the procedure of Example 2.

EXAMPLE 4

This example demonstrates the effect of treating calcium carbonate filler with water-insoluble calcium silicate on action of a silane coupling agent in sulfur vulcanized rubber composite.

A series of sulfur vulcanized rubber composites were prepared using the following composite formulation wherein the particular mineral filler and amount of silane employed was varied as shown in Table I.

Table I.

| Composite Formulation | Parts By Weight |
|---|---|
| Natural Rubber[1] | 50 |
| Styrene Butadiene Rubber[2] | 50 |
| Mineral Filler | 100 |
| Silane Coupling Agent[3] | As Shown |
| Stearic Acid | 1 |
| Zinc Oxide | 4 |
| Sulfur | 2 |
| NCBS[4] | 1 |
| DPG[5] | 0.3 |

[1]No. 1 Smoked Sheet
[2]SBR 1710
[3]3-mercaptopropyltrimethoxysilane
[4]N-cyclohexylbenzothiazolesulfenamide
[5]Diphenylguanidine The sulfur vulcanized rubber composites were all prepared in the same manner as follows:

The vulcanizable rubber polymers were charged to a water-cooled 2-roll rubber mill, banded thereon and milled until smooth and plastic. The mineral filler was added to the polymer band and where employed the silane coupling agent was added dropwise and concurrently with the mineral filler. After an intimate mixture of the polymer, filler and silane was obtained, the curing agents, accelerators and other ancillary ingredients employed were added and the mixture milled until an intimate dispersion was obtained. The mixture was stored at ambient room condition for a minimum of 16 hours, then remilled until smooth and plastic. Molding preformed sheets were cut from the remilled mixture and cured under pressure of about 1000 psi at an elevated temperature of about 320° F. After resting at ambient room condition for a minimum of 16 hours the physical properties of the sulfur vulcanized rubber composites were measured and are recorded in Table I below.

In Table I below Filler A represents the use of commercial wet ground untreated calcium carbonate (calcite mineral, Atomite, 2.5 microns, Thomson-Weinman Co.). Filler B represents the use of the same commercial untreated calcium carbonate mineral filler but after it had been slurried in water, washed and dried in the manner set forth in Example 1 above. Filler C represents the use of water-insoluble calcium silicate treated calcium carbonate mineral filler that had been prepared using the same ingredients and method described in Example 1 above with the exception that the parts by weight of precipitated water-insoluble calcium silicate per 100 parts by weight of the calcium carbonate mineral as charged to the aqueous slurry was varied as given in said Table I below.

cated treated carbonate mineral filler is employed along with the silane coupling agent.

Similar improved results may be obtained for example for compounding in appropriate amounts the water-insoluble calcium silicate treated calcium carbonate mineral filler prepared as in Example 1 along with an appropriate silane coupling agent into other conventional types of polymer composites such as thermoplastic resin composites, e.g. polyethylene, polyvinyl chloride, ethylene-vinyl acetate, and the like.

EXAMPLE 5

This example demonstrates the response of the water-insoluble calcium silicate treated calcium carbonate mineral fillers of this invention to silane coupling agents as compared to physical mixtures of calcium silicate and calcium carbonate fillers.

A series of sulfur vulcanized rubber composites were prepared using the same composite formulation and procedure given in Example 4 above and the following formulation.

| Composite Formulation | Parts By Weight |
|---|---|
| Natural Rubber[1] | 50 |
| Styrene Butadiene Rubber[2] | 50 |
| Mineral Filler | 50 |
| Silane Coupling Agent | As shown |
| Stearic Acid | 1.5 |
| Zinc Oxide | 6 |
| Sulfur | 2 |
| NCBS | 1.1 |
| DPG | 0.7 |

TABLE I
CURED COMPOSITE PROPERTIES

| Run No. | Filler (parts[1]) | Silane (parts[2]) | 300% Tensile Modulus(psi) | Tensile Strength(psi) | Elongation at Break (%) | Hardness (Shore A) |
|---|---|---|---|---|---|---|
| 1 | A | None | 325 | 1300 | 600 | 45 |
| 2 | A | 0.5 | 325 | 1225 | 575 | 45 |
| 3 | B | None | 350 | 1650 | 625 | 45 |
| 4 | B | 0.5 | 375 | 1825 | 650 | 45 |
| 5 | C(0.4) | None | 325 | 1875 | 650 | 45 |
| 6 | C(0.4) | 0.5 | 450 | 2000 | 650 | 50 |
| 7 | C(1.6) | None | 375 | 1975 | 650 | 50 |
| 8 | C(1.6) | 0.5 | 700 | 1825 | 650 | 50 |
| 9 | C(3.3) | None | 300 | 1925 | 650 | 45 |
| 10 | C(3.3) | 0.5 | 675 | 1950 | 575 | 50 |

[1]parts of precipitated water-insoluble calcium silicate used to treat 100 parts of calcium carbonate mineral starting material as charged to slurry.
[2]parts of 3-mercaptopropyltrimethoxysilane employed per 100 parts of Filler used.

Run Nos. 1 and 2 show that the untreated calcium carbonate mineral filler employed is non-responsive to the silane coupling agent, e.g. there was no improvement in the Tensile Modulus test. Run Nos. 3 and 4 show that aqueous slurrying washing and drying of the untreated calcium carbonate mineral filler employed does not affect the fillers response to the silane coupling agent. Run Nos. 5, 7 and 9 show that the water-insoluble calcium silicate treated calcium carbonate mineral filler of this invention when employed alone without the silane coupling agent has no effect on the Tensile Modulus properties of the cured composite article. Run Nos. 6, 8 and 10 demonstrate the instant invention and show that the water-insoluble calcium silicate treated calcium carbonate mineral filler of this invention is indeed responsive to the silane coupling agent as witnessed by the significant improvements in the Tensile Modulus of the cured composite article when said sili-

[1]No. 1 Smoked Sheet
[2]SBR 1710
[3]3-mercaptopropyltrimethoxysilane
[4]N-cyclohexylbenzothiazolesulfenamide
[5]Diphenylguanidine wherein the particular mineral filler and amount of silane employed was varied as shown in Table II.

In Table II below in Run Nos. 1–11 the same composite formulation given in Example 4 was employed while in Run Nos. 12–15 the composite formulation outlined above in this Example 5 was employed; Filler A represents the use of commercial wet ground untreated calcium carbonate (calcite mineral, Atomite, 2.5 microns, Thomson-Weinman Co.); Filler B represents a dry blended mixture of Filler A and synthetic precipitated calcium silicate (Silene EF, Pittsburg Plate Glass Industries); Filler C represents an aqueous slurry of Filler B; Filler D represents the use of water-insoluble calcium silicate treated calcium carbonate mineral filler that had been prepared using the same ingredients and method described in Example 1 above with the exception that 1.57 and 3.1 parts by weight of water-insoluble calcium silicate was precipitated and used per 100 parts by weight of the calcium carbonate mineral as charged to the aqueous slurry; Filler E represents the use of a dry blended mixture of synthetic precipitated calcium carbonate (Multifex 1DX, 0.05 micron, Diamond-Shamrock Corp.) and synthetic precipitated calcium silicate (Silene EF, Pittsburgh Plate Glass Ind.); and Filler F represents the use of water-insoluble calcium silicate treated calcium carbonate mineral filler that had been prepared using the same ingredients and method described in Example 1 above with the exception that the calcium carbonate mineral, starting material employed was synthetic precipitated calcium carbonate (Multifex 1DX, 0.05 micron, Diamond-Shamrock Corp.) and that 1.5 parts by weight of water-insoluble calcium silicate was precipitated and used per 100 parts by weight of the calcium carbonate as charged to the aqueous slurry. The parts by weight of the 3-mercaptopropyltrimethoxysilane coupling agent employed per 100 parts by weight of Filler used below as well as the parts by weight of calcium silicate employed per 100 parts by weight of the calcium carbonate mineral used are also given in Table II below.

TABLE II

| Run No. | Filler | Calcium Silicate (Parts by Wt.) | Silane (Parts by Wt.) | Cured Composite 300% Tensile Modulus(psi) |
|---|---|---|---|---|
| 1 | A | 0 | 0.0 | 325 |
| 2 | A | 0 | 0.5 | 300 |
| 3 | B | 1.25 | 0.0 | 350 |
| 4 | B | 1.25 | 0.5 | 375 |
| 5 | C | 1.25 | 0.0 | 350 |
| 6 | C | 1.25 | 0.5 | 325 |
| 7 | D | 1.57 | 0.0 | 375 |
| 8 | D | 1.57 | 0.5 | 700 |
| 9 | A | 0 | 1.5 | 475 |
| 10 | B | 3.0 | 1.5 | 575 |
| 11 | D | 3.0 | 1.5 | 1000 |
| 12 | E | 1.5 | 0.0 | 500 |
| 13 | E | 1.5 | 1.5 | 575 |
| 14 | F | 1.5 | 0.0 | 525 |
| 15 | F | 1.5 | 1.5 | 1025 |

Run Nos. 1 and 2 show that the untreated calcium carbonate mineral filler employed is non-responsive to the silane coupling agent and showed no improvement in the Tensile Modulus test even when employed with the silane. Run Nos. 3 and 4 and 5 and 6 show that physical mixtures of calcium carbonate and calcium silicate made by dry (Run Nos. 3 and 4) or wet (Run Nos. 5 and 6) methods are also inert to the silane coupling agent. Run Nos. 7 and 8 demonstrate the instant invention and show that the water-insoluble calcium silicate treated calcium carbonate mineral filler of this invention when employed along with the silane coupling agent is indeed silane responsive as witnessed by the significant improvement of the Tensile Modulus of the cured composite. A comparison of Run Nos. 9–11 again demonstrate that the water-insoluble calcium silicate treated calcium carbonate mineral filler of this invention (Run No. 11) is silane responsive and that the improvement in tensile modulus is not due to the mere presence of calcium silicate. Run Nos. 12–15 also demonstrate the same effects for fillers of the instant invention (Run Nos. 14 and 15) having a base of synthetic calcium carbonate having a higher surface area.

EXAMPLE 6

This example demonstrates the effect that the time between the formation of a water-insoluble metal silicate and its contact with an inorganic mineral filler has on the responsiveness of the water-insoluble metal silicate treated inorganic mineral to an organosilane coupling agent.

A series of sulfur vulcanized rubber composites were prepared according to the procedure of Example 4 using the following composite formulation.

| Composite Formulation | Parts by Weight |
|---|---|
| Natural Rubber[1] | 50 |
| Styrene Butadiene Rubber[2] | 50 |
| Mineral Filler | 100 |
| Silane | Varied |
| Stearic Acid | 1.5 |
| Zinc Oxide | 6 |
| Sulfur | 2 |
| NCBS[4] | 1.1 |
| DPG[5] | 0.7 |

[1]No. 1 Smoked Sheet
[2]SBR 1710
[3]3-mercaptopropyltrimethoxysilane
[4]N-cyclohexylbenzothiazole sulfenamide
[5]Diphenylguanidine The cured composite properties of the sulfur vulcanized Rubber articles are given in TABLE III below. In said TABLE III, Filler A represents the use of a water-insoluble calcium silicate treated calcium carbonate filler produced by employing the same ingredients, amounts and procedure of Example 1 above, i.e. the water soluble calcium silicate was precipitated in the presence of the calcium carbonate filler; Filler B represents the use of a water-insoluble calcium silicate treated filler produced by employing the same ingredients, amounts and procedure of Example 1 above except that the calcium carbonate filler was contacted with the water-insoluble calcium silicate immediately after completion of the precipitation of said silicate; Filler C represents the use of a water-insoluble calcium silicate treated calcium carbonate filler produced by employing the same ingredients, amounts and procedure of Example 1 above, except that the calcium carbonate filler was not contacted with the water-insoluble calcium silicate until ten minutes after completion of the precipitation of said silicate; Filler D represents the use of a water-insoluble calcium silicate treated calcium carbonate filler produced by employing the same ingredients, amounts and procedure of Example 1, except that the calcium carbonate filler was not contacted with the water-insoluble calcium silicate until 100 minutes after completion of the precipitation of said silicate; Filler E represents the use of a water-insoluble calcium silicate-treated calcium carbonate filler produced by employing the same ingredients, amounts and procedure of Example 1 above, except that the calcium carbonate filler was not contacted with the water-insoluble calcium silicate until 1000 minutes after completion of the precipitation of said silicate. The amount of the silane coupling agent used in terms of parts by weight per 100 parts by weight of filler employed in each composite is also given in TABLE III below.

TABLE 3

| Run No. | Filler | Silane PPHF | 300% Tensile Modulus (psi) | Tensile Strength (psi) | Elongation at Break (%) | Hardness (Shore A) |
|---|---|---|---|---|---|---|
| 1. | A | 0.0 | 375 | 1475 | 575 | 59 |
| 2. | A | 1.5 | 1125 | 1575 | 425 | 62 |
| 3. | B | 0.0 | 400 | 1675 | 575 | 59 |
| 4. | B | 1.5 | — | 875 | 175 | 64 |
| 5. | C | 0.0 | 425 | 1700 | 575 | 59 |
| 6. | C | 1.5 | — | 1125 | 250 | 64 |
| 7. | D | 0.0 | 400 | 1800 | 600 | 60 |
| 8. | D | 1.5 | — | 975 | 150 | 64 |
| 9. | E | 0.0 | 400 | 1650 | 575 | 60 |
| 10. | E | 1.5 | — | 1225 | 325 | 64 |

EXAMPLE 7

This example illustrates the response of various water-insoluble metal silicate-treated inorganic mineral fillers of this invention to organosilane coupling agents.

A variety of water-insoluble metal silicate-treated calcium carbonate mineral fillers were prepared employing the same ingredients and procedure of Example 1 above except, that the following different water-soluble salts were employed: Iron ($FeCl_3$), Barium ($BaCl_2$), Cadmium ($CdCl_2$), Cobalt ($CoCl_2.6H_2O$), Copper ($CuCl_2$), Lead ($Pb(O_2C_2H_3)_2.3H_2O$), Lithium (LiCl), Zinc ($ZnCl_2$), Beryllium ($Be(NO_3)_2.3H_2O$), Magnesium ($Mg(NO_3)_2.6H_2O$), Strontium ($SrCl_2.6H_2O$), Manganese ($MnCl_2.4H_2O$), Nickel ($NiCl_2.6H_2O$), Silver ($AgNO_3$), Mercury ($Hg(NO_3)_2.H_2O$), Tin ($SnCl_4.5H_2O$), Cerium ($Ce(NO_3)_3.6H_2O$) and Zirconium ($ZrOCl_2.8H_2O$), in place of the calcium chloride salt. A series of sulfur vulcanized rubber composites were then prepared according to the procedure of Example 4 using the composite formulation in Example 6 and the various different water-insoluble metal silicate treated calcium carbonate fillers prepared above along with different amounts of the silane coupling agent. The particular water-insoluble metal silicate treated calcium carbonate filler employed is indicated by the metal given in TABLE IV below, as is the amount of water-insoluble metal silicate precipitated and used in terms of parts by weight per 100 parts by weight of untreated calcium carbonate as charged to the aqueous slurry in the preparation of said silicate treated calcium carbonate fillers. The amount of the silane coupling agent employed in terms of parts by weight per 100 parts by weight of the silicate treated calcium carbonate filler used and the cured composite properties of the sulfur vulcanized rubber articles are also given in TABLE IV below.

TABLE IV

| | | Cured Composite Properties | | | | | |
|---|---|---|---|---|---|---|---|
| | | 300% Tensile Modulus (psi) | | Tensile Strength (psi) | | Elongation at Break (%) | |
| Run No. | Metal | Metal Silicate (PPHF) | ← | ← | Silane (PPHF) | → | → |
| | | | 0 | 1.5 | 0 | 1.5 | 0 | 1.5 |
| 1 | None | None | 425 | 525 | 1700 | 1275 | 575 | 450 |
| 2 | Iron | 1.85 | 775 | 1000 | 1325 | 1150 | 400 | 375 |
| 3 | Barium | 3.0 | 400 | 900 | 1825 | 1900 | 600 | 550 |
| 4 | Cadmium | 2.65 | 500 | 1100 | 1950 | 1850 | 575 | 475 |
| 5 | Cobalt | 1.9 | 400 | 875 | 1925 | 2075 | 600 | 575 |
| 6 | Copper | 1.96 | 426 | 675 | 1975 | 2025 | 650 | 575 |
| 7 | Lead | 3.98 | 375 | 500 | 1825 | 1900 | 600 | 675 |
| 8 | Lithium | 1.26 | 425 | 775 | 1900 | 1800 | 600 | 550 |
| 9 | Zinc | 1.99 | 350 | 1100 | 1900 | 2025 | 625 | 500 |
| 10 | Beryllium | 1.0 | 400 | — | 1950 | 925 | 625 | 250 |
| 11 | Magnesium | 1.0 | 400 | — | 1650 | 925 | 600 | 200 |
| 12 | Strontium | 1.0 | 400 | 825 | 1825 | 1250 | 600 | 375 |
| 13 | Manganese | 1.0 | 400 | — | 1775 | 1000 | 625 | 225 |
| 14 | Nickel | 1.0 | 400 | 850 | 1700 | 1400 | 575 | 450 |
| 15 | Silver | 1.0 | 425 | 625 | 1600 | 1350 | 550 | 500 |
| 16 | Mercury | 1.0 | 400 | 700 | 1750 | 1400 | 600 | 475 |
| 17 | Tin | 1.0 | 400 | 775 | 1550 | 1450 | 575 | 450 |
| 18 | Cerium | 1.0 | 350 | — | 1450 | 900 | 575 | 300 |
| 19 | Zirconium | 1.0 | 425 | 775 | 1850 | 1450 | 575 | 425 |

EXAMPLE 8

This example demonstrates the response of various water-insoluble metal silicate-treated inorganic mineral fillers of this invention to organosilane coupling agents.

A variety of water-insoluble calcium silicate-treated inorganic mineral fillers were employed, employing the same ingredients and procedure of Example 1 above, except that barium carbonate ($BaCO_3$), magnesium carbonate ($MgCO_3$), zinc carbonate ($ZnCO_3$), calcium sulfate ($CaSO_4.2H_2O$) and barium sulfate ($BaSO_4$) were employed as the inorganic mineral in place of the calcium carbonate mineral. A series of sulfur valcanized rubber composites were then prepared according to the procedure of Example 4 using the composite formulation in Example 6 and the various different water-insoluble calcium silicate treated inorganic mineral fillers prepared above, along with different amounts of the silane coupling agent. The particular water-insoluble calcium silicate treated inorganic mineral filler employed is indicated by the inorganic mineral given in TABLE V below, as is the amount of water-insoluble calcium silicate precipitated and used in terms of parts by weight per 100 parts by weight of the untreated inorganic mineral as charged to the aqueous slurry in the preparation of said calcium silicate treated inorganic mineral fillers. For comparison cured composites were also made in the same manner using the untreated inorganic mineral fillers. The amount of the silane coupling agent employed in terms of parts by weight per 100 parts by weight of the filler used in the composite and the cured composite properties of the sulfur vulcanized rubber articles are also given in TABLE V below.

TABLE V

| Run No. | Inorganic Mineral | Calcium Silicate (PPHF) | Silane (PPHF) | CURED COMPOSITE PROPERTIES | | |
|---|---|---|---|---|---|---|
| | | | | 300% Tensile Modulus (psi) | Tensile Strength (psi) | Elongation at Break (%) |
| 1 | $BaCO_3$ | None | 0.0 | 325 | 2100 | 600 |
| 2 | $BaCO_3$ | None | 1.5 | 850 | 925 | 325 |
| 3 | $BaCO_3$ | 1.6 | 0.0 | 325 | 2200 | 600 |
| 4 | $BaCO_3$ | 1.6 | 1.5 | 925 | 2225 | 525 |
| 5 | $MgCO_3$ | None | 0.0 | 850 | 1475 | 450 |
| 6 | $MgCO_3$ | None | 1.5 | 1050 | 1725 | 450 |
| 7 | $MgCO_3$ | 1.6 | 0.0 | 825 | 1425 | 450 |
| 8 | $MgCO_3$ | 1.6 | 1.5 | 1850 | 1875 | 300 |
| 9 | $ZnCO_3$ | None | 0.0 | 550 | 1275 | 450 |
| 10 | $ZnCO_3$ | None | 1.5 | 750 | 1550 | 475 |
| 11 | $ZnCO_3$ | 1.6 | 0.0 | 625 | 1350 | 450 |
| 12 | $ZnCO_3$ | 1.6 | 1.5 | 950 | 1350 | 375 |
| 13 | $CaSO_4 \cdot 2H_2O$ | None | 0.0 | 250 | 550 | 475 |
| 14 | $CaSO_4 \cdot 2H_2O$ | None | 1.5 | 550 | 775 | 425 |
| 15 | $CaSO_4 \cdot 2H_2O$ | 1.6 | 0.0 | 500 | 1550 | 550 |
| 16 | $CaSO_4 \cdot 2H_2O$ | 1.6 | 1.5 | 750 | 1650 | 475 |
| 17 | $BaSO_4$ | None | 0.0 | 325 | 1600 | 550 |
| 18 | $BaSO_4$ | None | 1.5 | — | 725 | 250 |
| 19 | $BaSO_4$ | 1.6 | 0.0 | 300 | 1775 | 600 |
| 20 | $BaSO_4$ | 1.6 | 1.5 | 750 | 1925 | 525 |

EXAMPLE 9

This example illustrates the effect of varying the metal oxide ratio on the responsiveness of the water-insoluble metal silicate treated inorganic mineral fillers of this invention to organosilane coupling agents.

Four water-insoluble calcium silicate-treated calcium carbonate mineral fillers were prepared and used to make sulfurized rubber composites according to the procedure of Example 4, using the composite formulation of Example 6. The cured composite properties are given in TABLE VI below. Filler A represents the use of untreated calcium carbonate (Atomite, 2.5 micron, Thompson-Weinman Co.); Filler B represents the use of a water-insoluble calcium silicate treated calcium carbonate mineral filler prepared by using the same ingredients and procedure given in Example 3 above. Filler C represents the use of a water-insoluble calcium silicate treated calcium carbonate mineral filler prepared by using the same ingredients and procedure given in Example 1 above; Filler D represents the use of a water-insoluble calcium silicate treated calcium carbonate mineral filler prepared by using the same ingredients and procedure given in Example 2 above. The amount of water-insoluble calcium silicate precipitated and used in the preparation of each of said silicate treated carbonate fillers was 1.6 parts by weight of calcium carbonate as charged in the preparation of said silicate treated fillers. Each composite formulation employed also contained 1.5 parts by weight per 100 parts by weight of the mineral filler employed in said composite. The metal oxide ratio ($CaO/SiO_2$) of each filler employed in said composite is also given in TABLE VI below.

TABLE VI

| Run No. | Filler | $CaO/SiO_2$ | CURED COMPOSITE PROPERTIES | | |
|---|---|---|---|---|---|
| | | | 300% Tensile Modulus (psi) | Tensile Strength (psi) | Elongation at Break % |
| 1 | A | 0 | 550 | 950 | 450 |
| 2 | B | 0.3 | 1100 | 1250 | 350 |
| 3 | B | 0.5 | 1000 | 1500 | 450 |
| 4 | C | 1.0 | 950 | 1400 | 450 |
| 5 | D | 2.0 | 800 | 1350 | 475 |
| 6 | D | 3.0 | 800 | 1325 | 450 |

EXAMPLE 10

This example illustrates the effect of water-insoluble metal silicate treated inorganic mineral fillers prepared by consecutively using two different water-insoluble metal silicates.

A series of water-insoluble metal silicate treated calcium carbonate mineral fillers were prepared by employing the same ingredients and procedure of Example 1 above except that in each instance two different water-soluble metal salt solutions were added to the aqueous slurry of calcium carbonate and sodium metasilicate solution consecutively and in the order indicated below. The reactants were employed in amounts calculated to provide equal volumes of each precipitated metal silicate, i.e., 0.25 ml. of precipitated metal silicate per 100 parts by weight of the calcium carbonate as charged. Sulfur vulcanized rubber composites were then prepared using said prepared water-soluble metal silicate treated calcium carbonate mineral fillers by the same procedure given in Example 4 above while using the same composite formulation given in Example 6 above. The amount of 3-mercaptopropyltrimethoxysilane coupling agent when used was 1.5 parts by weight per 100 parts by weight of the filler employed in the composite. The particular water-insoluble metal silicate treated calcium carbonate mineral fillers employed are indicated in TABLE VII below as is the cured composite properties of the sulfur vulcanized rubber articles. In TABLE VII below, Filler A represents the use of a water-insoluble calcium silicate, barium silicate treated calcium carbonate mineral filler prepared in the above described manner by employing consecutive solutions of water-soluble calcium chloride and barium chloride salts so as to precipitate the water-insoluble calcium and barium silicate salts in the order given; Filler B represents the use of a water-insoluble barium silicate, calcium silicate treated calcium carbonate mineral filler prepared in the above-described manner by employing consecutive solutions of water soluble barium chloride and calcium chloride salts as to precipitate the water-insoluble barium and calcium salts in the order given; Filler C represents the use of a water insoluble calcium silicate, zinc silicate treated calcium carbonate mineral filler prepared in the above-described manner by employing consecutive solutions of water soluble calcium chloride and zinc chloride salts so as to precipitate the water-insoluble calcium and zinc silicate salts in the order given; Filler D represents the use of a water-insoluble zinc silicate, calcium silicate treated calcium carbonate mineral filler prepared in the above-described manner by employing consecutive solutions of water soluble zinc chloride and calcium chloride salts so as to precipitate the water-insoluble zinc and calcium silicate salts in the order given; Filler E represents the use of a water-insoluble barium silicate, zinc silicate treated calcium carbonate mineral filler prepared in the above-described manner by employing consecutive solutions of water soluble barium chloride and zinc chloride salts so as to precipitate the water-insoluble barium and zinc silicate salts in the order given; and Filler F represents the use of a water-insoluble zinc silicate, barium silicate treated calcium carbonate mineral filler prepared in the above-described manner by employing consecutive solutions of water-soluble zinc chloride and barium chloride salts so as to precipitate the water-insoluble zinc and barium silicate salts in the order given.

TABLE VII

| Run No. | Filler | Silane (PPHF) | 300% Tensile Modulus (psi) | Tensile Strength (psi) | Elongation at Break % |
|---|---|---|---|---|---|
| 1 | A | 0.0 | 400 | 1875 | 575 |
| 2 | A | 1.5 | 475 | 1600 | 525 |
| 3 | B | 0.0 | 425 | 1500 | 525 |
| 4 | B | 1.5 | 825 | 1875 | 500 |
| 5 | C | 0.0 | 425 | 1675 | 575 |
| 6 | C | 1.5 | 11755 | 1825 | 450 |
| 7 | D | 0.0 | 375 | 1875 | 600 |
| 8 | D | 1.5 | 1075 | 1650 | 425 |
| 9 | E | 0.0 | 400 | 1775 | 575 |
| 10 | E | 1.5 | 1200 | 1625 | 400 |
| 11 | F | 0.0 | 350 | 1775 | 600 |
| 12 | F | 1.5 | 1275 | 1550 | 350 |

EXAMPLE 11

This example illustrates the effect of water-insoluble metal silicate treated inorganic mineral fillers prepared by consecutively using two different water-insoluble metal silicates.

A series of water-insoluble metal silicate treated calcium carbonate mineral fillers were prepared by employing the same ingredients and procedure of Example 1 above except that in each instance two different water-soluble metal salt solutions were mixed together before addition to the aqueous slurry of calcium carbonate and sodium metalsilicate solution. The reactants were employed in amounts calculated to provide equal volumes of the coprecipitated mixed water-insoluble metal silicate, i.e. 0.5 mil. of coprecipitated water-insoluble metal silicate per 100 parts by weight of the calcium carbonate as charged. Sulfur vulcanized rubber composites were then prepared using said prepared water-insoluble mixed metal silicate treated calcium carbonate mineral fillers by the same procedure given in Example 4, above, while using the same composite formulation given in Example 6 above. The amount of 3-mercaptopropyltrimethoxysilane when used was 1.5 parts by weight of the filler employed in the composite. The particular water-insoluble mixed metal silicate treated calcium carbonate fillers employed are indicated in TABLE VIII below as is the cured composite properties of the sulfur vulcanized rubber articles. In TABLE VIII below, Filler A represents the use of a water insoluble calcium and barium silicate mixture treated calcium carbonate mineral filler prepared in the above-described manner by employing a premixture solution of water-soluble calcium chloride and barium chloride salts so as to coprecipitate the mixture of water-insoluble calcium and barium silicate salts together; Filler B represents the use of a water-insoluble calcium and zinc silicate mixture treated calcium carbonate mineral filler prepared in the above-described manner by employing a premixture solution of water-soluble calcium chloride and zinc chloride salts so as to coprecipitate the mixture of water-insoluble calcium and zinc silicate salts together; and Filler C represents the use of a water-insoluble barium and zinc silicate mixture treated calcium carbonate mineral filler prepared in the above-described manner by employing a premixture solution of water-soluble barium chloride and zinc chloride salts so as to coprecipitate the mixture of water-insoluble barium and zinc silicate salts together.

TABLE VIII

| Run No. | Filler | Silane (PPHF) | 300% Tensile Modulus (psi) | Tensile Strength (psi) | Elongation at Break % |
|---|---|---|---|---|---|
| 1 | A | 0.0 | 300 | 1500 | 600 |
| 2 | A | 1.5 | 1475 | 1500 | 300 |
| 3 | B | 0.0 | 375 | 1575 | 575 |
| 4 | B | 1.5 | 1125 | 1625 | 400 |
| 5 | C | 0.0 | 375 | 1650 | 575 |
| 6 | C | 1.5 | 1025 | 1850 | 475 |

EXAMPLE 12

This example illustrates the responsiveness of different water-insoluble metal silicate treated inorganic mineral fillers to different organosilane coupling agents in different composite formulations.

A variety of water insoluble metal silicate treated calcium carbonate mineral fillers were employed by using the same ingredients and procedure in Example 1 above except that different water-soluble metal salts were employed. The particular water insoluble metal silicate treated calcium mineral filler prepared and employed in this example is indicated by the metal given in the following TABLES IX, X and XI as is the amount of water-insoluble metal silicate precipitated and used in terms of parts by weight per 100 parts by weight of untreated calcium carbonate as charged to the aqueous slurry in the preparation of said silicate treated calcium carbonate filler. For instance, in TABLES IX, X and XI below Filler A represents the use of untreated calcium carbonate (Atomite, 2.5 microns, Thomson-Weinman) as a control comparison, while Filler B represents the use of a water-insoluble calcium silicate treated calcium carbonate filler prepared in the above described manner using a water-soluble calcium chloride salt, said filler having a metal oxide ($CaO/SiO_2$) ratio of 1/3; Filler C represents the use of a water-insoluble barium silicate treated calcium carbonate filler prepared in the above described manner using a water-soluble barium chloride salt, said filler having a metal oxide (BaO/SiO$_2$) ratio of 1/1; Filler D represents a water-insoluble zinc silicate treated calcium carbonate treated filler prepared in the above described manner using a water-soluble zinc chloride salt, said filler having a metal oxide (ZnO/SiO$_2$) ratio of 1/1; and Filler E represents a water-soluble calcium silicate treated calcium carbonate filler prepared in the above described manner using a water-soluble calcium chloride salt, said filler having a metal oxide (CaO/SiO$_2$) ratio of 1/1.

The water-insoluble metal silicate treated calcium carbonate fillers so prepared were then employed in various composite formulations and the cured composite properties of the prepared vulcanized articles are given in TABLES IX, X and XI below. The cured vulcanized composite articles were all prepared in the same manner by following the procedure of Example 4 above except that different curable composite formulations were employed. For instance in TABLE IX below the following curable composite formulation was employed.

| Composite Formulation | Parts By Weight |
|---|---|
| EPDM Rubber[1] | 100 |
| Mineral Filler[2] | 100 |
| Silane Coupling Agent[3] | As Shown |
| EGDM[4] | 4 |
| DCP[5] | 1.6 |

[1]Royalene 501, (Uniroyal Corp.) (Ethylene Propylene Diene Monomer Rubber)
[2]Varied as shown
[3]Varied as shown
[4]Ethylene glycol dimethacrylate
[5]Dicumylperoxide, recrystallized In TABLE X below the following curable composite formulation was employed.

| Composite Formulation | Parts By Weight |
|---|---|
| Chloroprene Rubber[1] | 100 |
| Mineral Filler[2] | 100 |
| Silane Coupling Agent[3] | As Shown |
| Stearic Acid | 0.5 |
| Zinc Oxide | 5 |
| Magnesium Oxide | 4 |
| Process Oil[4] | 7.5 |
| TMTU[5] | 0.5 |

[1]Neoprene W, (DuPont Co.)
[2]Varied as shown
[3]Varied as shown
[4]Circosol 4240
[5]Tetramethylthiourea In TABLE XI the following curable composite formulation was employed.

| Composite Formulation | Parts By Weight |
|---|---|
| Nitrile Rubber[1] | 100 |
| Mineral Filler[2] | 100 |
| Silane Coupling Agent[3] | As Shown |
| Stearic Acid | 1.5 |
| Zinc Oxide | 5 |
| Sulfur | 1.75 |
| MBTS[4] | 1.5 |
| TMTD[5] | 0.5 |
| DBP[6] | 20 |

[1]Hycar 1052, (B. F. Goodrich Chem. Co.)
[2]Varied as shown
[3]Varied as shown
[4]Mercaptobenzothiazyldisulfide
[5]Tetramethylthiuramdisulfide
[6]Dibutylphthalate.

The amount of silane coupling agent when used is expressed in TABLES IX, X and XI below is expressed in terms of parts by weight per 100 parts by weight of mineral filler employed in the composite. In TABLE IX below, Silane A represents the use of a vinyltriethoxysilane coupling agent; Silane B represents the use of a isoprenyltrimethoxysilane, (1-trimethoxysilyl,1,3-methyl-butadiene-1,3) coupling agent; and Silane C represents the use of a methacryloxypropyltrimethoxysilane coupling agent. In TABLE X below Silane D represents the use of a 3-aminopropyltrimethoxysilane coupling agent. In TABLES X and XI, below Silane E represents the use of a 3-mercaptopropyltrimethoxysilane coupling agent.

TABLE IX

| Run No. | Filler | Silicate Metal | Silicate PPHF | Silane Type | Silane PPHF | PEROXIDED CURED EPDM RUBBER PROPERTIES 300% Tensile Modulus (psi) |
|---|---|---|---|---|---|---|
| 1 | A | None | 0.0 | None | 0.0 | 300 |
| 2 | B | Ca | 1.6 | None | 0.0 | 325 |
| 3 | C | Ba | 3.0 | None | 0.0 | 300 |
| 4 | D | Zn | 2.0 | None | 0.0 | 325 |
| 5 | A | None | 0.0 | A | 1.0 | 350 |
| 6 | B | Ca | 1.6 | A | 1.0 | 550 |
| 7 | C | Ba | 3.0 | A | 1.0 | 500 |
| 8 | D | Zn | 2.0 | A | 1.0 | 500 |
| 9 | A | None | 0.0 | B | 1.0 | 450 |
| 10 | B | Ca | 1.6 | B | 1.0 | —* |
| 11 | C | Ba | 3.0 | B | 1.0 | 825 |
| 12 | D | Zn | 2.0 | B | 1.0 | 1075 |
| 13 | A | None | 0.0 | C | 1.0 | 425 |
| 14 | B | Ca | 1.6 | C | 1.0 | 975 |
| 15 | C | Ba | 3.0 | C | 1.0 | 750 |
| 16 | D | Zn | 2.0 | C | 1.0 | 1200 |

*Not determinable since excessive response at 1.0 PPHF silane level produced a composite elongation less than 300%.

TABLE X

| Run No. | Filler | Silicate Metal | Silicate PPHF | Silane Type | Silane PPHF | Metal Oxide Cured Chloroprene Rubber Properties 300% Tensile Modulus (psi) | Tear Strength (psi) |
|---|---|---|---|---|---|---|---|
| 1 | A | None | 0.0 | None | 0.0 | 375 | 160 |
| 2 | E | Ca | 1.6 | None | 0.0 | 375 | 170 |
| 3 | A | None | 0.0 | D | 1.0 | 350 | 150 |
| 4 | E | Ca | 1.6 | D | 1.0 | 875 | 220 |
| 5 | A | None | 0.0 | E | 1.0 | 575 | 180 |
| 6 | E | Ca | 1.6 | E | 1.0 | 1250 | 180 |

TABLE XI

| Run No. | Filler | Silicate Metal | Silicate PPHF | Silane Type | Silane PPHF | Sulfur Cured Butadiene-Acrylonitrile Rubber Properties 300% Tensile Modulus (psi) | Tear Strength (psi) |
|---|---|---|---|---|---|---|---|
| 1 | A | None | 0.0 | None | 0.0 | 175 | 50 |
| 2 | D | Ca | 1.6 | None | 0.0 | 175 | 60 |
| 3 | C | Zn | 2.0 | None | 0.0 | 175 | 60 |
| 4 | A | None | 0.0 | E | 1.5 | 175 | 50 |
| 5 | D | Ca | 1.6 | E | 1.5 | 300 | 90 |
| 6 | C | Zn | 2.0 | E | 1.5 | 350 | 100 |

EXAMPLE 13

2.84 pounds of sodium metasilicate nonahydrate ($Na_2SiO_3 \cdot 9H_2O$) were added to a thirty gallon kettle fitted with a mechanical stirrer along with five gallons of water and stirred until the sodium salt had dissolved. Then 10 gallons of a 50 weight percent aqueous slurry of wet ground calcium carbonate (58 pounds $CaCO_3$, calcite mineral, Atomite, 2.5 micron, Thomson-Weinman Co.) were added and the mixture stirred for about ten minutes. Then 11.1 pounds of a 10 weight percent aqueous solution of anhydrous calcium chloride ($CaCl_2$) were added in increments of 500 ml. every five minutes. After addition of all the $CaCl_2$ the mixture was stirred for two hours. The desired water-insoluble calcium silicate treated calcium carbonate mineral product was then filtered from the reaction mixture and dried.

EXAMPLE 14

A series of sulfur vulcanized rubber composites were prepared using the following composite formulation wherein the particulate mineral filler employed was the water-insoluble calcium silicate treated calcium carbonate mineral product of Example 13 and wherein the amount of silane employed was varied as shown in Table XII.

| Composite Formulation | Amount Grams |
|---|---|
| Natural Rubber[1] | 100 |
| Styrene Butadiene Rubber[2] | 100 |
| Mineral Filler[3] | 200 |
| Silane Coupling Agent[4] | As shown |
| Stearic Acid | 3 |
| Zinc Oxide | 12 |
| Sulfur | 4 |
| NCBS[5] | 2.2 |
| DPG[6] | 1.4 |

[1]No. 1 smoked sheet
[2]SBR 1710
[3]3-Mercaptopropyltrimethoxysilane
[4]Water-insoluble calcium silicate treated calcium carbonate mineral product of Example 13.
[5]N-cyclohexyl-2-benzothiazolesulfenamide
[6]Diphenylguanidine The sulfur vulcanized rubber composites were all prepared in the same manner following the procedure outlined in Example 4 and press cured at about 320° F. The physical properties of the sulfur vulcanized rubber composites were measured and are recorded in Table XII below.

TABLE XII

| Run No. | Silane (ml.) | 300% Tensile Modulus (psi) | Tensile Strength (psi) | Elongation at Break (%) | Hardness Shore A |
|---|---|---|---|---|---|
| 1 | None | 390 | 1300 | 525 | 55 |
| 2 | 1.0 | 700 | 1350 | 475 | 55 |
| 3 | 2.0 | 950 | 1440 | 425 | 56 |
| 4 | 3.0 | 990 | 1570 | 425 | 56 |

Run numbers 2-4 show that the water-insoluble calcium silicate treated calcium carbonate mineral filler of this invention when employed along with the silane coupling agent is indeed silane responsive as witnessed by the significant improvement of the Tensile Modulus of the cured composite.

EXAMPLE 15

This example demonstrates the production of an organosilane modified water-insoluble calcium silicate treated calcium carbonate mineral filler.

About 2724 grams of the water-insoluble calcium silicate treated calcium carbonate product of Example 13 were thoroughly mixed with about 27.24 grams of gamma-methacryloxypropyltrimethoxysilane in the presence of about 120 milliliters of an aqueous-alcohol diluent (90% methanol and 10% water) in a twin shell blender at room temperature for about 10–15 minutes. The desired silane modified silicate treated mineral filler product so formed was then recovered and dried for one hour at about 110° C.

EXAMPLE 16

A series of cross-linked polyethylene composites were prepared using the following composite formulation wherein the particular mineral filler and amount of silane employed was varied.

| Composite Formulation | Parts by Weight |
|---|---|
| Polyethylene Resin | 100 |
| Mineral Filler | 120 |
| Silane Coupling Agent[1] | As Shown |
| Blue Pigment[2] | 1.5 |
| Antioxidant[3] | 1.1 |
| Crosslinking Agent[4] | 3.9 |

[1]Gamma-methacryloxypropyltrimethoxysilane
[2]Blue Pigment F-6279 (Ferro Corp.)
[3]Age Rite Resin D-a polymerized 1,2-dihydro-2,2,4-trimethylquinoline (R.T. Vanderbilt Co.)
[4]Dicup 40KE, Dicumyl peroxide (Hercules Inc.)

The crosslinked polyethylene composites were all prepared in the same manner as follows:
The polyethylene resin was charged to a 2-roll mill (mill temperature-front roll 170° F.; back-roll 180° F. at 65 pounds of pressure) and banded thereon and milled until smooth and plastic. One-half of the mineral filler was added to the polymer band and where employed the silane coupling agent was added dropwise and concurrently with the mineral filler, and thoroughly mixed. Then the rest of the filler was added and thoroughly mixed, followed by the addition of other ingredients (antioxidant, peroxide and pigment) which were also thoroughly mixed. The composite formulation was then taken off of the rolls and molded by crosslinking (curing) the composite formulation for 20 minutes in a compression mold at 320° F. The median physical properties of the crosslinked polyethylene composites were measured and are recorded in Table XIII below.

In Table XIII below, Filler A of Run No. 1 represents the use of commercial wet ground untreated calcium carbonate (calcite mineral, Atomite, 2.5 microns, Thomson-Weinman Co.) and no silane coupling agent was employed in the composite formulation of said Run No. 1. Filler B of Run No. 2 represents the use of the water-insoluble calcium silicate treated calcium carbonate mineral product of Example 13, but no silane coupling agent was employed in the composite formulation of said Run No. 2. Filler C of Run No. 3 represents the use of the organosilane modified water-insoluble calcium silicate treated calcium carbonate mineral composition product of Example 15 and no further silane coupling agent was employed in the composite formulation of said Run No. 3. Filler D of Run No. 4 represents the use of the water-insoluble calcium silicate treated calcium carbonate mineral product of Example 13 and the composite formulation of said Run No. 4 also contained 1.2 parts by weight of gamma-methacryloxypropyltrimethoxysilane (based on the 100 parts by weight of polyethylene employed). In Run Numbers 1 and 2 of Table XIII below the median tensile modulus was measured at 300% while for Run Numbers 3 and 4 it was measured at 200 percent.

TABLE XIII

| Run No. | Mineral Filler | Tensile Modulus (psi.) | Crosslinked Composite Properties | | Hardness Shore A |
|---|---|---|---|---|---|
| | | | Tensile Strength (psi.) | Elongation at Break % | |
| 1 | A | 1150 | 1975 | 500 | 95 |
| 2 | B | 1215 | 1519 | 440 | 96 |
| 3 | C | 1976 | 2000 | 250 | 95 |
| 4 | D | 1877 | 1877 | 250 | 95 |

Comparison Run Numbers 1 and 2 show that low Tensile Modulus results were obtained for the crosslinked composites when either the untreated calcium carbonate mineral filler or the calcium silicate treated calcium carbonate mineral filler was employed without a silane coupling agent. Run Numbers 3 and 4 which demonstrate the instant invention show that highly improved Tensile Modulus results were obtained for the cross-linked composites, when the silane modified calcium silicate treated calcium carbonate mineral filler was employed even without any additional silane coupling agent, and when the calcium silicate treated calcium carbonate mineral filler was employed along with a silane coupling agent. Thus, Run Numbers 3 and 4 demonstrate that the calcium silicate treated calcium carbonate mineral filler is responsive to the silane coupling agent both when modified with the silane coupling agent prior to addition to the composite formulation or when employed separately along with the silane coupling agent in the composite formulation.

EXAMPLE 17

This example demonstrates the production of an organosilane modified water-insoluble calcium silicate treated calcium carbonate mineral filler.

About 5 pounds of the water-insoluble calcium silicate treated calcium carbonate mineral product of Example 13 were thoroughly mixed with about 22.7 grams of vinyl-tris(2-methoxyethyoxy)silane in the presence of about 120 milliliters of an aqueous-alcohol diluent (90% methanol and 10% water) in a twin shell blender at room temperature for about 10–15 minutes. The desired silane modified silicate treated mineral filler product so formed was then recovered and dried in an oven for two hours at about 225° F. It was found that the use of said silane modified water-insoluble calcium silicate treated calcium carbonate mineral filler product improved the tensile modulus properties of a sulfur vulcanized elastomeric composite over that of the same composite when an untreated calcium carbonate mineral filler was employed. Such demonstrates the responsiveness of the silane coupling agent and the calcium silicate treated calcium carbonate mineral filler in the production of said silane modified silicate treated mineral filler.

EXAMPLE 18

This example demonstrates the production of an organosilane modified water-insoluble calcium silicate treated calcium carbonate mineral filler.

About 5 pounds of the water-insoluble calcium silicate treated calcium carbonate mineral product of Example 13 were thoroughly mixed with about 22.7 grams of gamma-methacryloxypropyltrimethoxysilane in the presence of about 120 milliliters of an aqueous-alcohol diluent (90% methanol and 10% water) in a twin shell blender at room temperature for about 10–15 minutes. The desired silane modified silicate treated mineral filler product so formed was then recovered and dried in an oven for two hours at about 225° F. It was found that the use of said silane modified water-insoluble calcium silicate calcium carbonate mineral filler product improved the tensile modulus properties of a sulfur vulcanized elastomeric composite over that of the same composite when an untreated calcium carbonate mineral filler was employed. Such demonstrates the responsiveness of the silane coupling agent and the calcium silicate treated calcium carbonate mineral filler in the production of said silane modified silicate treated mineral filler.

EXAMPLE 19

This example demonstrates the production of an organosilane modified water-insoluble calcium silicate treated calcium carbonate mineral filler.

About 5 pounds of the water-insoluble calcium silicate treated calcium carbonate mineral product of Example 13 were thoroughly mixed with about 22.7 grams of gamma-aminopropyltriethoxysilane in the presence of about 120 milliliters of an aqueous-alcohol diluent (90% methanol and 10% water) in a twin shell blender at room temperature for about 10–15 minutes. The desired silane modified silicate treated mineral filler product so formed was then recovered and dried in an oven for two hours at about 225° F. It was found that the use of said silane modified calcium silicate treated calcium carbonate mineral filler product improved the tensile modulus properties of a thermoplastic polyvinyl chloride composite over that of the same composite when an untreated calcium carbonate mineral filler was employed. Such demonstrates the responsiveness of the silane coupling agent and the calcium silicate treated calcium carbonate mineral filler in the production of said silane modified silicate treated mineral filler.

Various modifications and variations of this invention will be obvious to a worker skilled in the art and it is to be understood that such modifications and variations are to be included within the purview of this application and the spirit and scope of the appended claims.

What is claimed is:

1. An organosilane modified metal silicate treated inorganic mineral composition, said composition having been produced by a process which comprises contacting a water-insoluble metal silicate treated inorganic mineral product, said product having been produced by a process which comprises (a) contacting in the presence of water, the surface of naturally occurring water-insoluble calcium carbonate with a precipitated, undried water-insoluble metal silicate salt wherein the metal of said salt is selected from the group consisting of aluminum, barium, beryllium, cadmium, calcium, cobalt, copper, iron, lead, lithium, magnesium, manganese, mercury, nickel, silver, strontium, tin, zinc, zirconium, and the rare earth metals having atomic numbers from 57 to 71 inclusive, and mixtures thereof, wherein the amount of said water-insoluble metal silicate salt employed ranges from about 0.1 parts by weight to about 20.0 parts by weight per 100 parts by weight of said water-insoluble calcium carbonate, and (b) drying said water-insoluble metal silicate salt on the surface of said water-insoluble calcium carbonate; with an organosilane coupling agent selected from the group consisting of organo-functional silanes having the formula $$R-\underset{\underset{R'_a}{|}}{Si}-(X)_{3-a}$$

wherein R which contains a carbon atom directly bonded to the Si atom of the above formula represents a functionally substituted organic radical, R' represents a radical selected from the group consisting of R and monovalent hydrocarbon radicals, a has a value of 0 or 1, and X represents a hydrolyzable group, the hydrolyzates of said silanes, the condensates of said silanes, and mixtures thereof.

2. An organosilane modified metal silicate treated inorganic mineral composition as defined in claim 1, wherein the metal of the water-insoluble metal silicate salt is selected from the group consisting of barium, calcium and zinc.

3. An organosilane modified metal silicate treated inorganic mineral composition as defined in claim 2, wherein the water-insoluble metal silicate salt is a calcium silicate.

4. An organosilane modified metal silicate treated inorganic mineral composition as defined in claim 2, wherein the metal oxide ratio of the water-insoluble metal silicate salt is less than about 3.1 and the amount of the water-insoluble metal silicate salt employed ranges from about 0.3 to about 10.0 parts by weight per 100 parts by weight of the calcium carbonate starting material.

5. An organosilane modified metal silicate treated inorganic mineral composition as defined in claim 4, wherein step (a) of the process comprises precipitating said water-insoluble metal silicate to form same while in the presence of said water-insoluble calcium carbonate.

6. A polymer composite composition comprising (1) a polymer component, (2) a water-insoluble metal silicate treated inorganic mineral product, said product having been produced by a process which comprises (a) contacting in the presence of water, the surface of naturally occurring water-insoluble calcium carbonate with a precipitated, undried water-insoluble metal silicate salt wherein the metal of said salt is selected from the group consisting of aluminum, barium, beryllium, cadmium, calcium, cobalt, copper, iron, lead, lithium, magnesium, manganese, mercury, nickel, silver, strontium, tin, zinc, zirconium, and the rare earth metals having atomic numbers from 57 to 71 inclusive, and mixtures thereof, wherein the amount of said water-insoluble metal silicate salt employed ranges from about 0.1 parts by weight to about 20.0 parts by weight per 100 parts by weight of said water-insoluble calcium carbonate and (b) drying said water-insoluble metal silicate salt on the surface of said water-insoluble calcium carbonate, and (3) an organosilane coupling agent selected from the group consisting of organofunctional silanes having the formula $$R-\underset{\underset{R'_a}{|}}{Si}-(X)_{3-a}$$

wherein R which contains a carbon atom directly bonded to the Si atom of the above formula represents a functionally substituted organic radical, R' represents a radical selected from the group consisting of R and monovalent hydrocarbon radicals, a has a value of 0 or 1, and X represents a hydrolyzable group, the hydrolyzates of said silanes, the condensates of said silanes, and mixtures thereof.

7. A polymer composite composition comprising (1) a polymer component and (2) an organosilane modified metal silicate treated inorganic mineral composition as defined in claim 1.

* * * * *